(12) United States Patent
Millon

(10) Patent No.: US 7,604,507 B1
(45) Date of Patent: Oct. 20, 2009

(54) BATTERY INTERFACE ASSEMBLY

(75) Inventor: Christopher M. Millon, Grand Blanc, MI (US)

(73) Assignee: Cobasys, LLC, Orion, MI (US)

( * ) Notice: Subject to any disclaimer, the term of this patent is extended or adjusted under 35 U.S.C. 154(b) by 0 days.

(21) Appl. No.: 12/188,573

(22) Filed: Aug. 8, 2008

(51) Int. Cl.
*H01R 24/00* (2006.01)

(52) U.S. Cl. .................................... 439/627

(58) Field of Classification Search ............. 439/627, 439/500
See application file for complete search history.

(56) References Cited

U.S. PATENT DOCUMENTS

| | | | |
|---|---|---|---|
| 6,097,173 A * | 8/2000 | Bryant, Jr. ............... | 320/107 |
| 6,186,831 B1 * | 2/2001 | Tsai ........................ | 439/627 |
| 6,261,719 B1 | 7/2001 | Ikeda et al. | |
| 6,270,378 B1 * | 8/2001 | Lee ......................... | 439/627 |
| 6,346,011 B1 * | 2/2002 | Ikeda ....................... | 439/627 |
| 6,523,274 B1 | 2/2003 | Saito et al. | |
| 6,896,995 B2 | 5/2005 | Saito | |
| 7,077,704 B2 * | 7/2006 | Ikeda et al. ............... | 439/627 |
| 7,229,320 B2 * | 6/2007 | Saito et al. ............... | 439/627 |
| 2006/0160422 A1 * | 7/2006 | Bang et al. ............... | 439/627 |

* cited by examiner

*Primary Examiner*—Gary F. Paumen
(74) *Attorney, Agent, or Firm*—Harness, Dickey & Pierce, P.L.C.

(57) ABSTRACT

A battery interface assembly for a battery system includes a first end section and a second end section. The first end section provides a source voltage from battery modules of the battery system via a conductive bus bar. The battery interface assembly also includes X intermediate housing sections that receive and house respective sections of the conductive bus bar and that detachably interconnect with each other and with the first and second end sections. The first and second end sections and the X intermediate housing sections are contiguously aligned. X is an integer greater than or equal to 0.

23 Claims, 8 Drawing Sheets

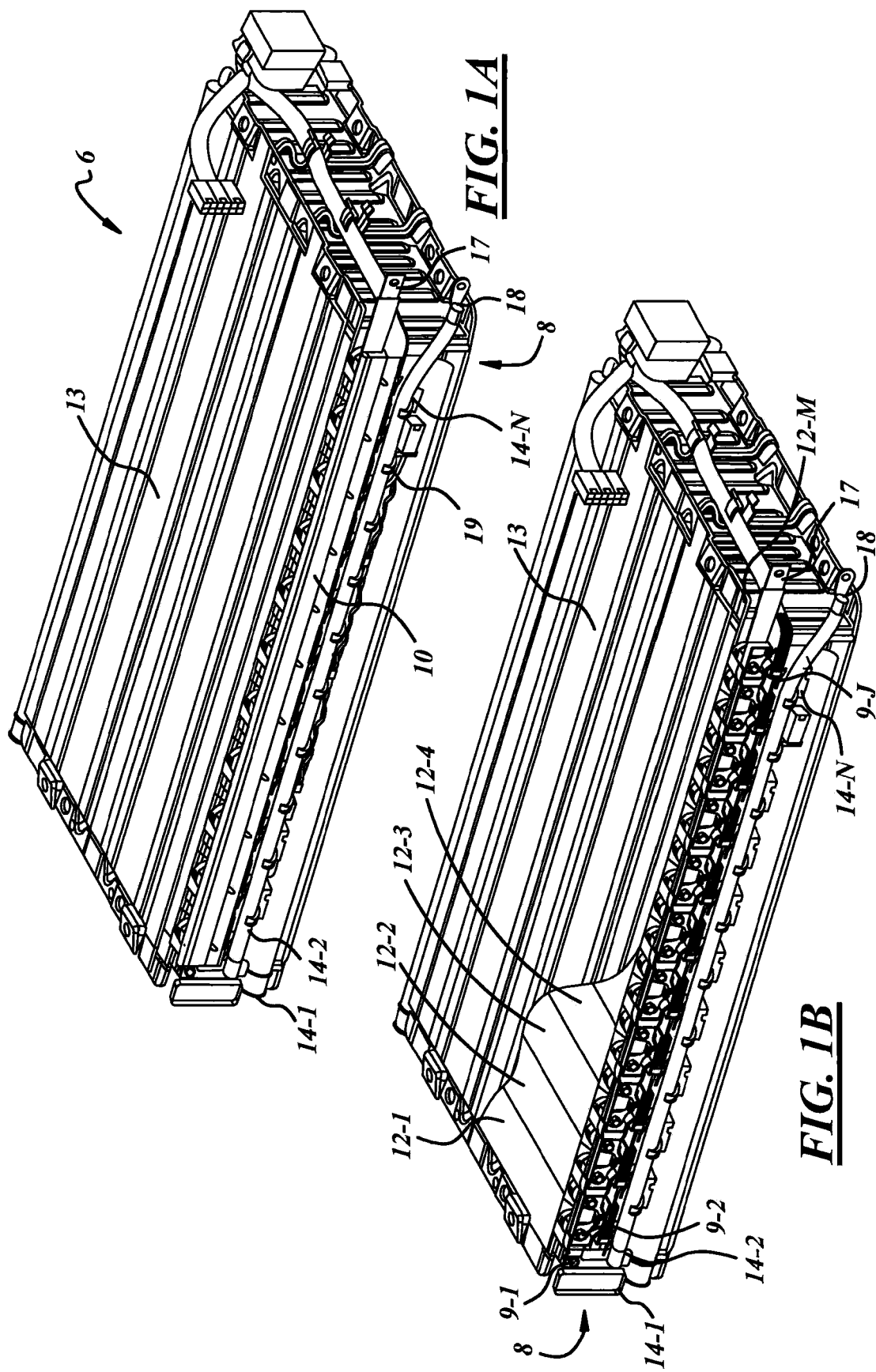

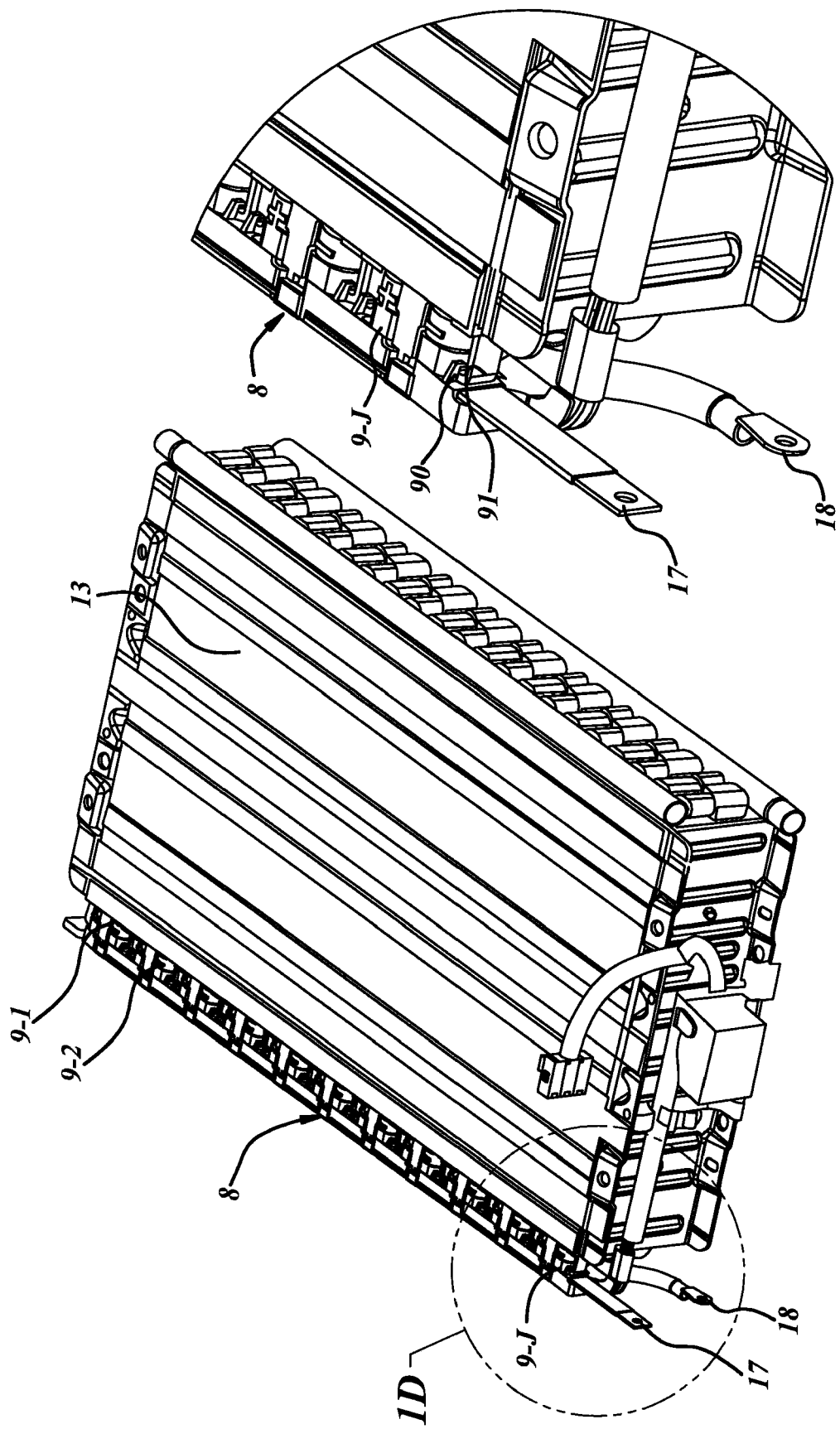

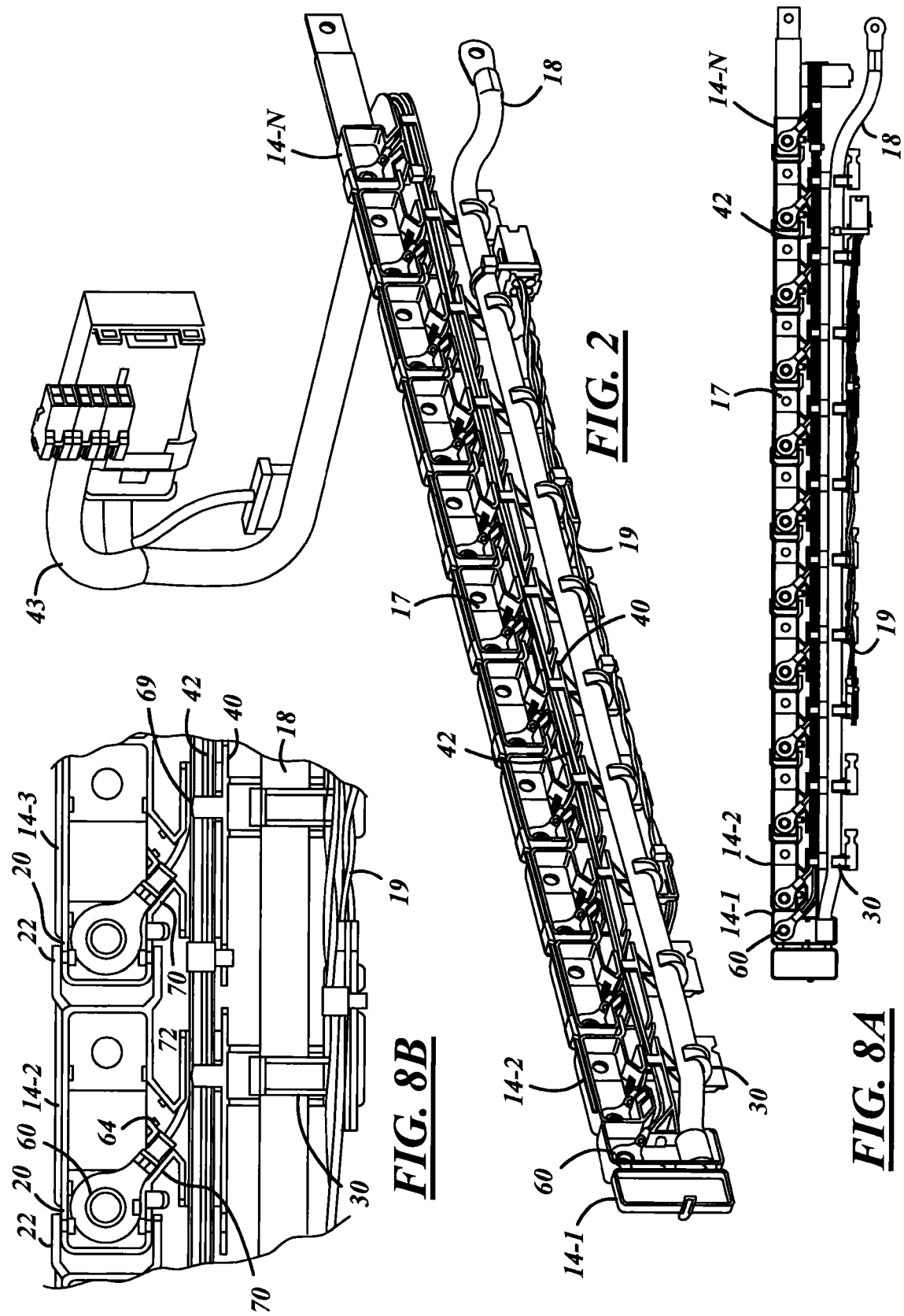

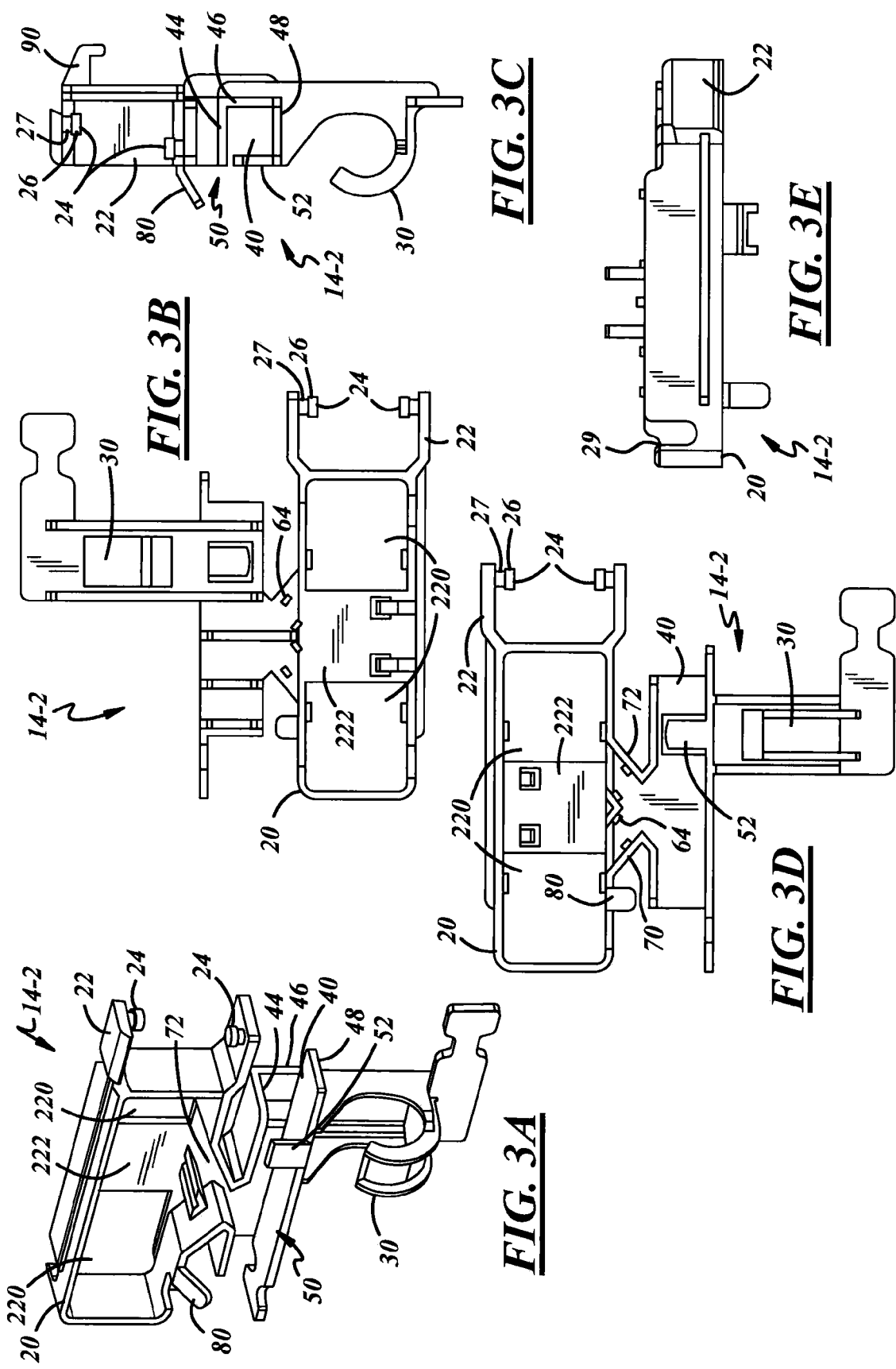

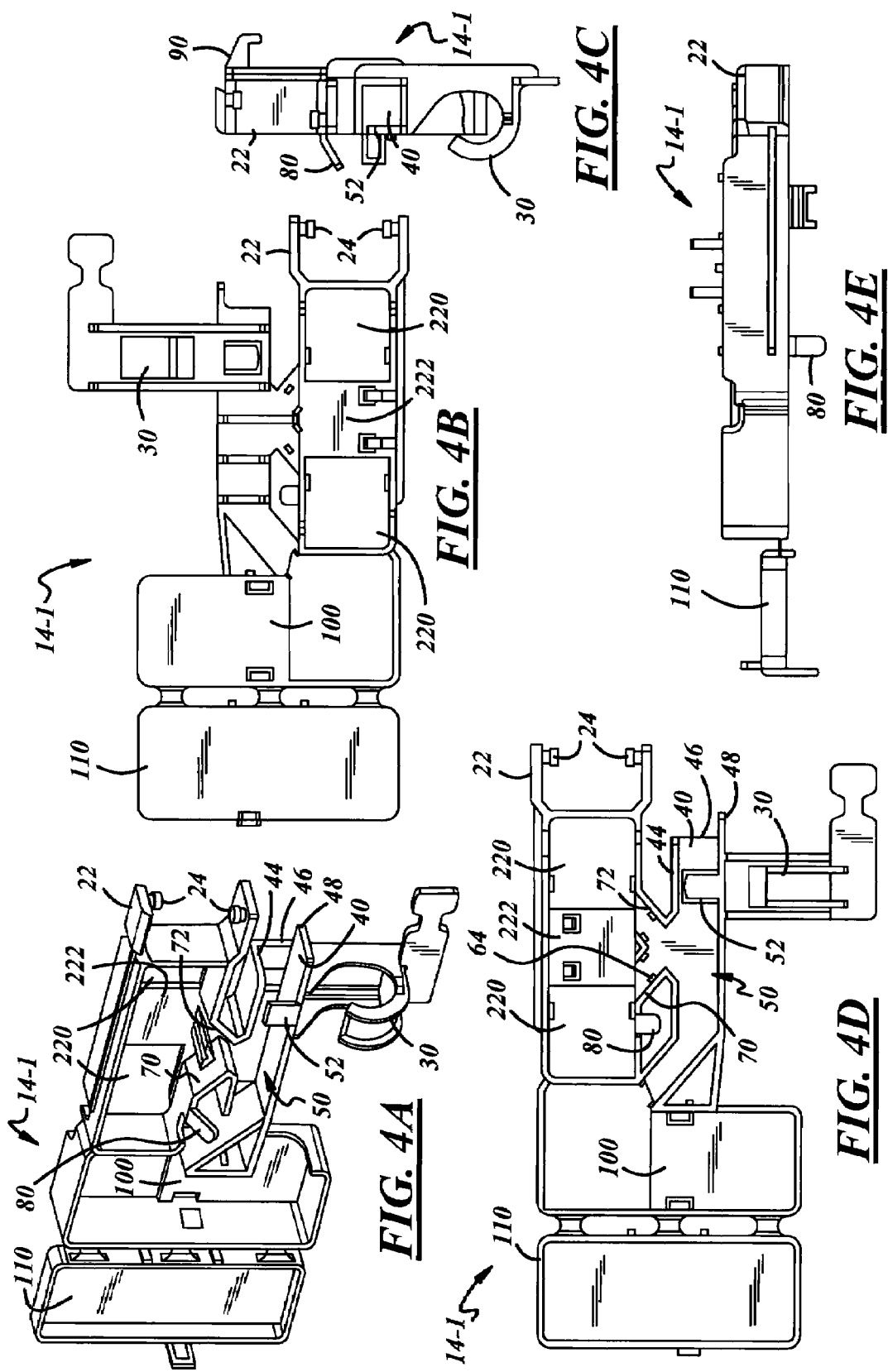

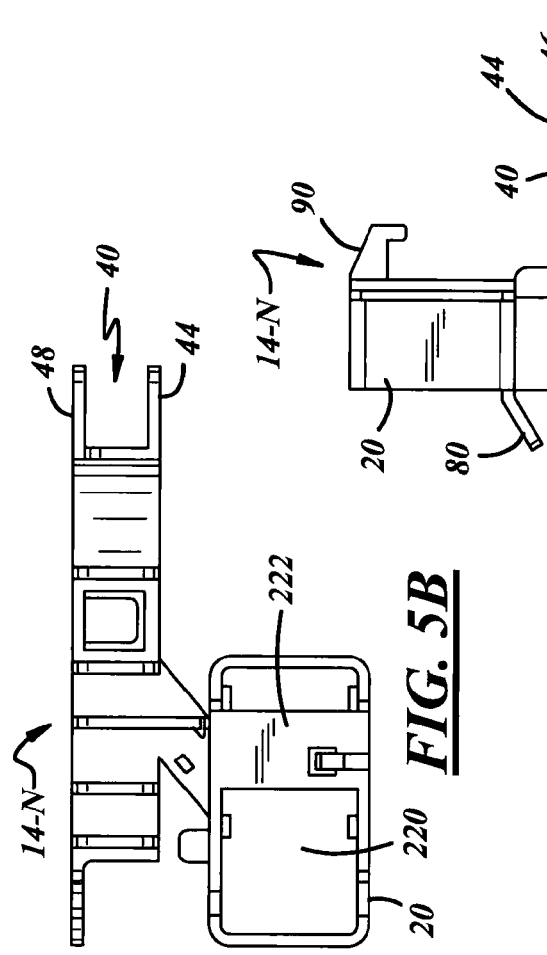
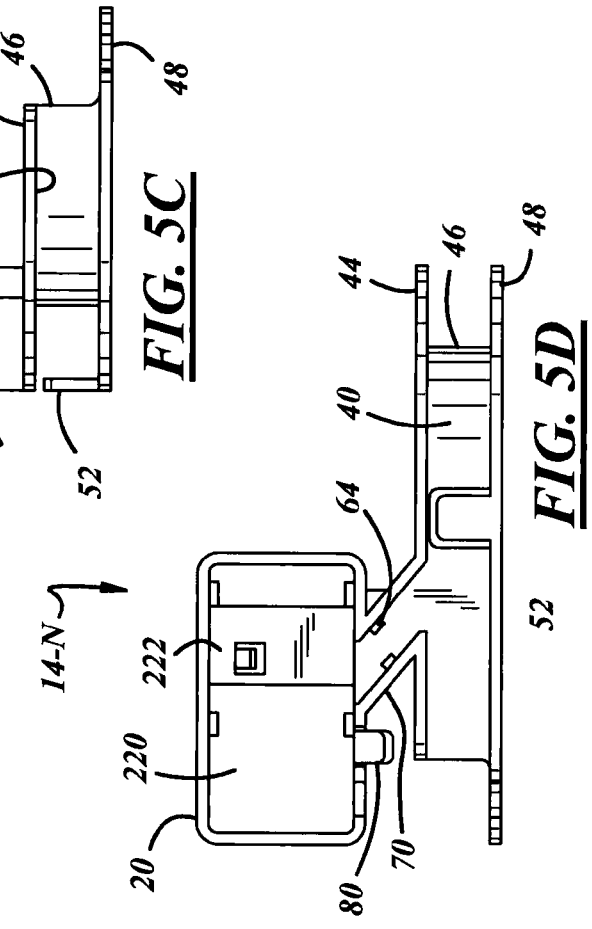
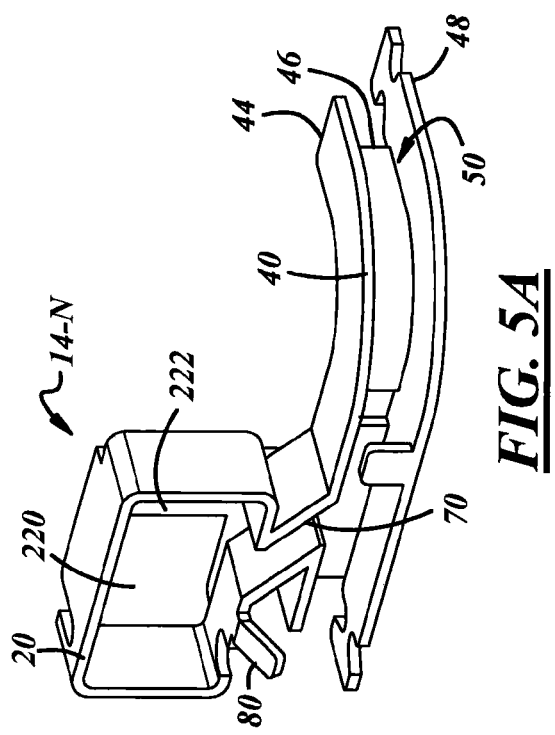
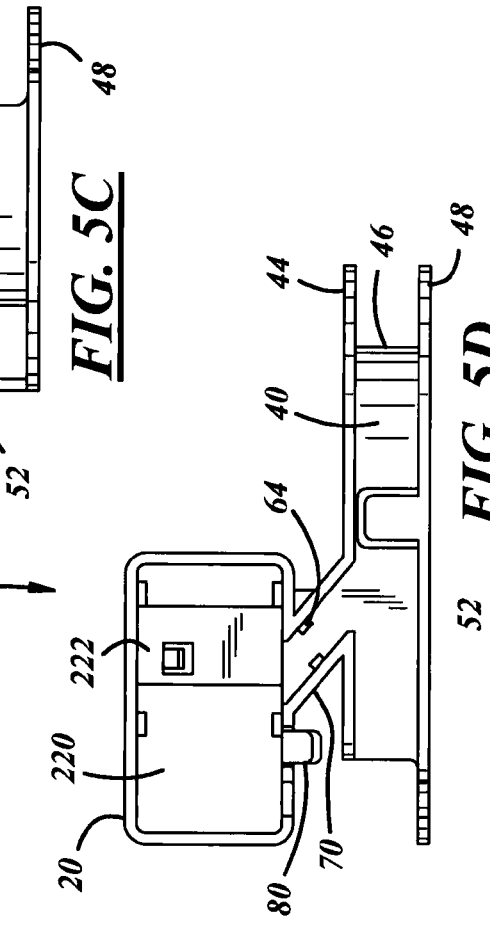
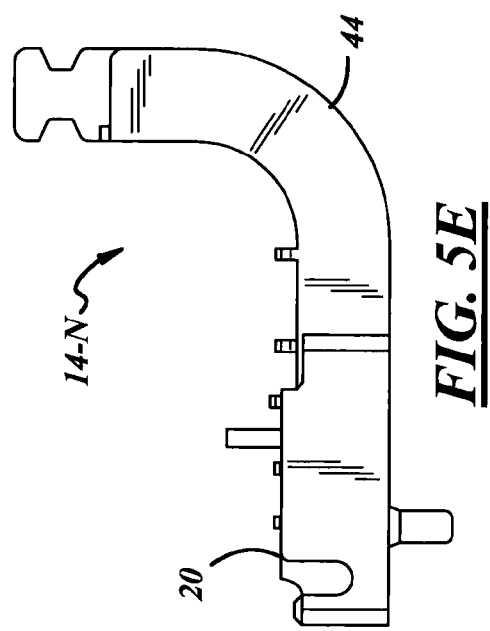

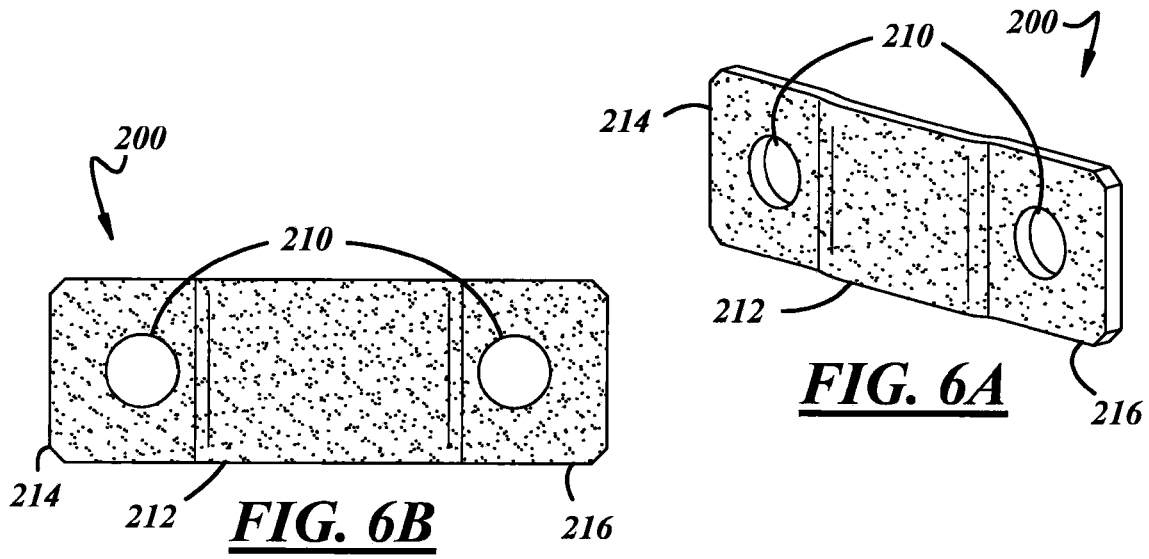
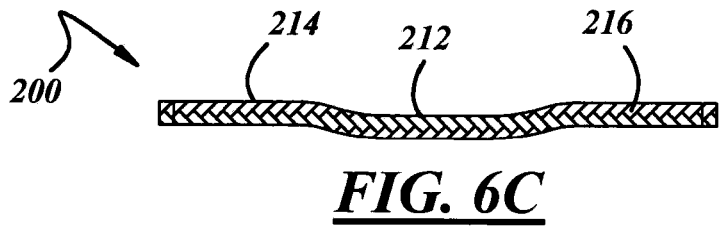
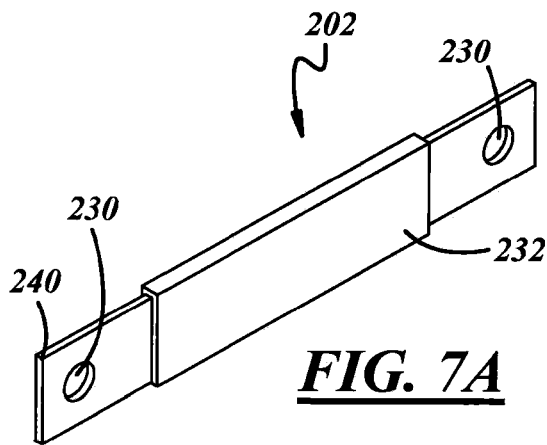
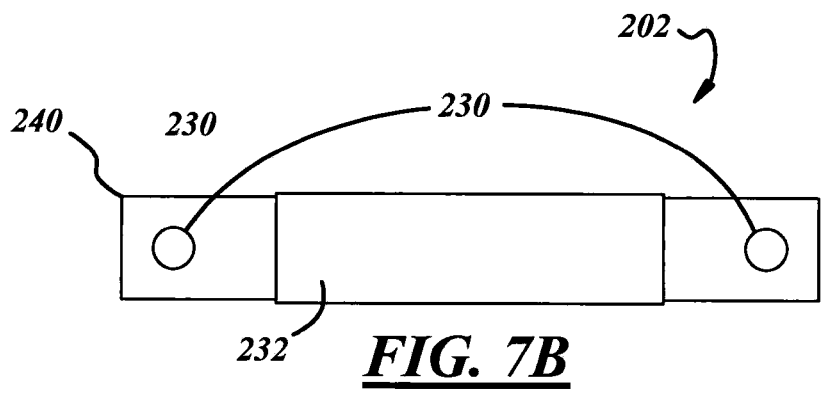

BATTERY INTERFACE ASSEMBLY

FIELD

The present disclosure relates to battery systems and, more particularly, to a battery interface assembly for a battery system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A battery system may include a battery cassette that includes one or more battery modules connected in series and/or parallel. Each of the battery modules may include one or more battery cells connected in series and/or parallel. Interface assemblies may couple to and interconnect the battery modules and allow the modules to provide power to an external device. Interface assemblies may also electrically isolate one or more of the battery modules.

Battery systems are often utilized in dynamic environments such as vehicles for hybrid electric applications. Therefore, interface assemblies commonly include flexible thermoplastic materials such as polymeric blends. However, batteries typically generate heat during operation, which may cause the thermoplastic materials to expand. Further, components of interface assemblies are typically molded or welded together based on a predetermined length.

SUMMARY

A battery interface assembly for a battery system includes a first end section and a second end section. The first end section provides a source voltage from battery modules of the battery system via a conductive bus bar. The battery interface assembly also includes X intermediate housing sections that receive respective sections of the conductive bus bar and that detachably interconnect with each other and with the first and second end sections. The first and second end sections and the X intermediate housing sections are contiguously aligned. X is an integer greater than or equal to 0.

In other features, the first and second end sections include at least one of a male connector and a female connector and interconnect with the X intermediate housing sections via the one of the male and female connectors. The X intermediate housing sections each comprise at least one of a male connector and a female connector and detachably interconnect with each other via the one of the male and female connectors. A male connector may be a predetermined size smaller than the female connector such that a gap is formed between interconnected ones of the male and female connectors.

In other features, each of the X intermediate housing sections communicates with a respective one of X battery modules. L intermediate housing sections interconnect with the X intermediate housing sections and communicate with L battery modules that differ from the X battery modules. L is an integer greater than or equal to 0. The X intermediate housing sections and the L intermediate housing sections communicate with X+L respective sections of the conductive bus bar.

In other features, each of the X intermediate housing sections defines a respective portion of a channel. The channel receives a plurality of leads. Each of the X intermediate housing sections includes lead guides that retain at least one of the plurality of leads at a predetermined angle. Each of the X intermediate housing sections includes a support device for a reference voltage cable. One of the first and second end sections communicates with the reference voltage cable.

In other features, a battery system includes the battery interface assembly and further includes the conductive bus bar. The bus bar further includes an end bar that communicates with the sections, and that may be at least partially inserted within the first and/or second end sections. The end bar communicates externally from the battery system. At least one of the sections and the end bar includes layers of woven wire.

In other features, a battery system includes X interconnecting sections of a battery interface assembly that cover terminals of Y battery modules. The system also includes a bus bar that includes Z sections that are received in respective ones of the X interconnecting sections and that communicate with the terminals of respective ones of the Y battery modules. X, Y and Z are integers greater than 1. The X interconnecting sections include a first end section, a second end section and Y intermediate housing sections positioned between the first and second end sections. The first and second end sections differ from the intermediate housing sections.

In other features, the first and second end sections include at least one of a male connector and a female connector and interconnect with the Y intermediate housing sections via the one of the male and female connectors. The Y intermediate housing sections each comprise at least one of a male connector and a female connector and detachably interconnect with each other via the one of the male and female connectors. L intermediate housing sections interconnect with the Y intermediate housing sections and communicate with terminals of L battery modules that differ from the Y battery modules. L is an integer greater than or equal to 0.

In other features, the Y intermediate housing sections and the L intermediate housing sections communicate with Z+L respective sections of the conductive bus bar. At least one of the Z sections of a conductive bus bar includes layers of woven wire. The bus bar further includes an end bar that communicates with the Z sections and that communicates externally from the battery system. The X interconnecting sections define a respective section of a channel. The channel receives a plurality of leads. Each of the X interconnecting sections includes lead guides that retain at least one of the plurality of leads at a predetermined angle. In other features, a first one of the X interconnecting sections includes a connector that detachably couples together with a second one of the X interconnecting sections. The connector includes a head portion and a neck portion. The second one of the X interconnecting sections includes a first side that defines an opening that receives the neck portion. The neck portion includes a predetermined length that is longer than a thickness of the first side. A cross section of the neck is smaller than an area of the opening such that the connector moveable couples to the first side.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein:

FIG. 1A is a perspective view of a battery system, according to the present disclosure;

FIGS. 1B-1D are perspective views of the battery system including components exposed by removal of a terminal cover, according to the present disclosure;

FIG. 2 is a perspective view of a battery interface assembly, according to the present disclosure FIG. 3A is a perspective view of an interconnect section, according to the present disclosure;

FIG. 3B is a back view of an interconnect section, according to the present disclosure;

FIG. 3C is a side view of an interconnect section, according to the present disclosure;

FIG. 3D is a front view of an interconnect section, according to the present disclosure;

FIG. 3E is a top view of an interconnect section, according to the present disclosure;

FIG. 4A is a perspective view of an end section, according to the present disclosure;

FIG. 4B is a rear view of an interconnect section, according to the present disclosure;

FIG. 4C is a side view of an interconnect section, according to the present disclosure;

FIG. 4D is a front view of an interconnect section, according to the present disclosure;

FIG. 4E is a top view of an interconnect section, according to the present disclosure;

FIG. 5A is a perspective view of an interconnect section, according to the present disclosure;

FIG. 5B is a rear view of an interconnect section, according to the present disclosure;

FIG. 5C is a side view of an interconnect section, according to the present disclosure;

FIG. 5D is a front view of an interconnect section, according to the present disclosure;

FIG. 5E is a top view of an interconnect section, according to the present disclosure;

FIG. 6A is a perspective view of a section of a bus bar, according to the present disclosure;

FIG. 6B is a front view of a section of a bus bar, according to the present disclosure;

FIG. 6C is a top view of a section of a bus bar, according to the present disclosure;

FIG. 7A is a perspective view of an end section of a bus bar, according to the present disclosure;

FIG. 7B is a front view of an end section of a bus bar, according to the present disclosure;

FIG. 8A is a front view of a battery interface assembly, according to the present disclosure;

FIG. 8B is a front detail view of battery leads at a predetermined angle, according to the present disclosure;

DESCRIPTION

Figure 9:
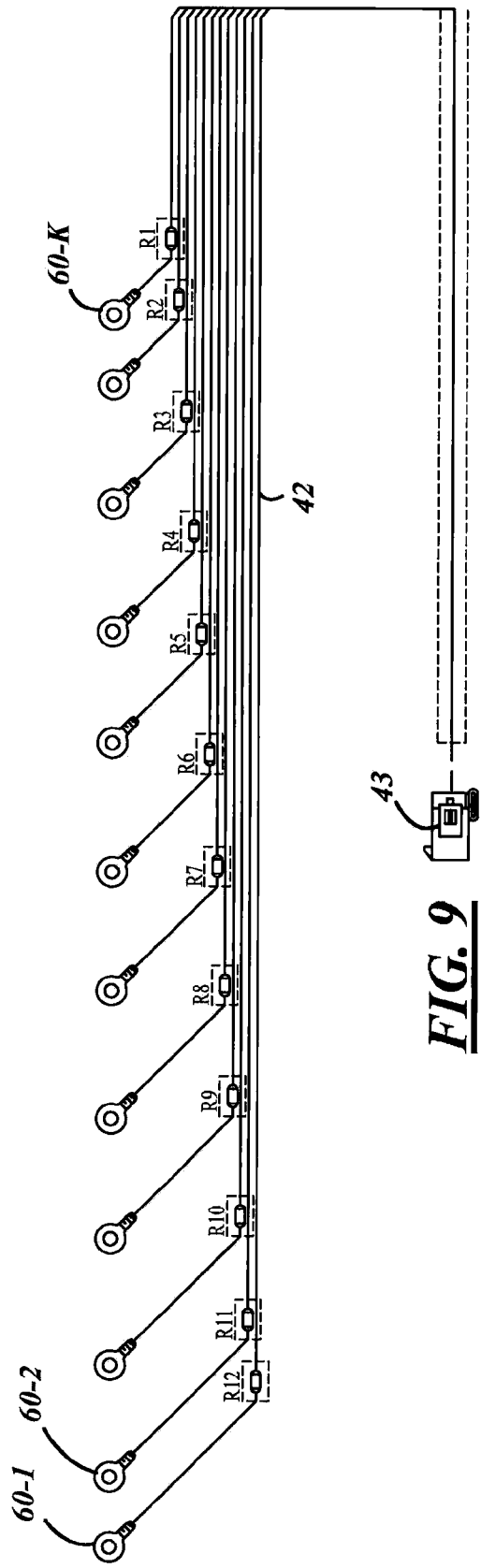
FIG. 9 is a schematic diagram of battery leads, according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

Referring now to FIGS. 1-2, a battery system 6 is illustrated. The battery system 6 includes a battery interface assembly 8. A cover 10 of the interface assembly 8 covers and protects terminal screws 9-1, 9-2, . . . , and 9-J (referred to herein as terminal screws 9) of a plurality of battery modules 12-1, 12-2, . . . , and 12-M (referred to herein as battery modules 12). A battery cassette 13 includes the battery modules 12.

Each of the battery modules 12 has a respective positive terminal and negative terminal that corresponds to respective terminal screws 9. The battery modules 12 may be stacked together in parallel and/or series. The positive terminals may therefore be disposed in adjoining relation to corresponding negative terminals of adjacent battery modules.

The battery interface assembly 8 includes a plurality of interconnect sections 14-1, 14-2, . . . , and 14-N (referred to herein as interconnect sections 14). The interconnect sections 14 may be detachably connected, which means that the interconnect sections 14 may be coupled together and decoupled from each other without damaging to the interconnect sections 14. A bus bar 17 may be at least partially housed and retained within the interconnect sections 14 and may communicate with the battery modules 12. The interconnect sections 14 may also retain a reference voltage cable 18 and various other wires and/or cables 19. The reference voltage cable 18 may communicate with a reference voltage, such as ground.

Referring now to FIGS. 3A-3E, the interconnect sections 14 may include end sections 14-1 and 14-N and intermediate housing sections 14-2 to 14-(N−1). Each of the intermediate housing sections 14-2 to 14-(N−1) may communicate with a respective battery module. In FIGS. 3A-3E, an exemplary intermediate housing section 14-2 is illustrated. The intermediate housing section 14-2 includes male and female connectors 20, 22 for connecting with adjacent sections. In other words, respective male connectors of intermediate housing sections may fit into female connectors of adjacent intermediate housing sections. The male and/or female connectors 20, 22 may be sized to allow movement between the connectors 20, 22. For example, the male connectors 20 may not fit snugly into the female connectors 22 and may instead be a predetermined size that is smaller than openings of the female connectors 22. Therefore, a gap may be provided between the exteriors of the male connectors 20 and interiors of the female connectors 22.

The male and/or female connectors 20, 22 may include connectors 24, such as snap-fit connectors, as illustrated, that couple adjacent intermediate housing sections together that may include head portions 26 coupled to necks 27. The head portions 26 may have larger cross sections than the necks 27. The head portions 26 may snap into respective openings 29 defined in walls of the male connectors 22. The necks 27 may have predetermined lengths. The walls of the male connectors 22 may have a corresponding thickness. The necks 27 may be longer than the thickness of the walls. Further, the openings 29 may be sized to allow the necks 27 to move.

Referring now to FIGS. 4A-5E, end sections 14-1, 14-N of the interconnect sections 14 are illustrated. Additional intermediate housing section(s) may be added to the system 6 by removing one of the end sections 14-1, 14-N and connecting respective male and/or female connectors 20, 22 of the addition intermediate housing section(s) to male or female connectors 20, 22 of the existing interconnected sections 14. For example, when additional battery modules are added to the cassette 13, additional intermediate housing sections may also be added that communicate with the additional battery modules. The male connectors 20 may be sized to house sections of the bus bar 17.

Some or all of the interconnect sections 14 may include clips 30 that retain the reference voltage cable 18. The clips 30 may include hooks of various shapes and sizes or other retaining device(s). For example, each interconnect section 14 may include a hook, and the hooks collectively form a channel that may retain the reference voltage cable 18 along a length thereof.

The interconnect sections 14 may also each provide channels 40 for high voltage lead wires 42. The channels 40 may route the wires 42 and may be defined by at least three sides 44, 46, 48 and an opening 50 that receives the wires 42. The channels 40 may each have one or more associated flaps 52 that may fold over and snap in place to at least partially close the opening 50 when the wires 42 are strung along the channels 40.

The wires 42 each include leads 60 that communicate with the bus bar and at least one terminal of each of the battery modules and provide a source voltage from the battery terminals. The interconnect sections 14 may each include snap-fit sections 64 that secure the leads 60 in place at a predetermined angle, such as an angle of around 40-45 degrees. The snap-fit sections 64 may include snaps into which the leads 60 are pressed and/or flaps that snap over the leads 60 after they are positioned. The interconnect sections 14 may also include one or more channels 70, 72 for further securing the leads 60 in place. The channels 70, 72 may also retain the leads 60 at the predetermined angle that minimizes and/or prevents breakage of the leads. The wires 42 may communicate with a wire harness 43 that may be used to provide power to external devices from the battery system 6.

Each of the interconnect sections 14 may also include touch-safe features 80 that may snap over and at least partially enclose the leads and/or the bus bar 17. The touch-safe features 80 may include an insulative material, such as polypropylene, that may at least partially protect the bus bar 17 and/or leads from shorting out. The interconnect sections 14 may also include hanging sections 90, which may include hooks, that may be used to hang the battery interface assembly 8 onto the battery cassette 13. The battery cassette 13 may include receiving sections 91 that receive the hanging sections 90.

In FIGS. 4A-4E, the end section 14-1 is illustrated. The end section 14-1 may be similar to the intermediate housing sections 14-2 to 14-(N−1) but may only include one of the male and female connectors 20, 22. A female connector 22 is illustrated. The intermediate housing section 14-2 may link with the end section 14-1 via the female connector 22. The end section 14-1 may also include a contact area 100 that may include an electrically conductive material that allows the leads 60 to communicate with the reference voltage cable 18. The end section 14-1 may also include a non-conductive cover 110 that is isolated from the contact area 100. The cover 110 minimizes risk of shorting the contact area 100 during transportation of the battery interface assembly 8.

In FIGS. 5A-5E, the end section 14-N is illustrated. The end section 14-N may be similar to the intermediate housing sections 14-2 to 14-(N−1) but may only include one of the male and female connectors 20, 22. A male connector 20 is illustrated. The intermediate housing section 14-(N−1) may link with the end section 14-N via the male connector 20. The end section 14-N may also include a channel 40, but unlike the intermediate housing sections 14-2 to 14-(N−1), the channel 40 may be rounded to feed the leads to the wire harness 43.

Referring now to FIGS. 6A-7B, components of the bus bar 17 are illustrated. The bus bar 17 may include a plurality of bus bar sections 200-1, 200-2, ..., and 200-L (referred to herein as bus bar sections 200) and an end bar 202. The bus bar sections 200 may include openings 210 that receive battery terminals from the battery modules and may include various shape configurations. For example, the bus bar sections 200 may include a strip-like shape that may be flat or contoured. An exemplary contoured bus bar section 200 is illustrated in FIGS. 6A-6C. The contoured bus bar section 200 includes a mid-portion 212 that is offset from two side portions 214, 216. The male connector 20 of the interconnect sections 14 may be sized to receive the bus bar section 200. The male connector 20 may therefore include openings 220 that receive the two side portions 214, 216. The male connector 20 may also receive a retaining portion 222. The mid-portion 212 of the bus bar section 200 may be sized to receive the retaining portion 222. The retaining portion 222 may therefore be secured between the bus bar section 200 and the respective battery module.

The bus bar sections 200 may be made of conductive metal. The bus bars sections 200 may be embedded in the interconnect sections 14. When the interconnect sections 14 communicate with the battery modules, the bus bar sections 200 electrically connect adjacent positive and negative terminals of the battery modules. The bus bar sections may be arranged so that an end of one bus bar section communicates with an end of an adjacent bus bar section, thereby forming a continuously conductive bus bar 17.

The bus bar sections 20 may be solid pieces of conductive metal or may include a plurality of wires braided together, as illustrated in the top view of FIG. 6C. The braided bus bar section may be more flexible than a solid metal bus bar section and may therefore provide flexibility for the system 6. The braided bus bar sections 200 may include numerous strands of wire, for example 36 gage wire. For example, in that particular bus bar there are 24 individual bundles of wire and each of those 24 bundles includes 40 individual wires braided together lengthwise along the bus bar section 200.

In FIGS. 7A-7B, an exemplary end bar 202 of the bus bar 17 is illustrated. The end bar 202 may include openings 230 that receive terminals from the battery modules. The end bar 202 may also be at least partially insulated in an area 232 between the openings 230. The insulation may inhibit shorting out of the end bar 202. The end bar 202 may communicate with an adjacent one of the bus bar sections 200. Therefore, the terminals of the battery modules may communicate externally via a contact point 240 on the end bar 202.

Referring now to FIGS. 8A-9, an exemplary configuration for the leads 60-1, 60-2, ..., and 60-K (collectively referred to as leads 60) is illustrated. The leads 60 may communicate with lead wires 42 that fit into the channel 40 and that may be positioned at a predetermined angle relative to the channel 40. The leads 60 may be electrically isolated from each other and may plug into various devices via the harness 43.

Figure 10B:
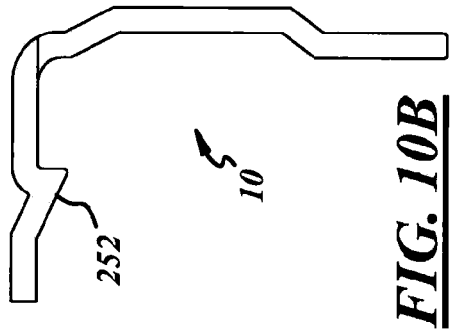
FIG. 10B is a side view of a terminal cover, according to the present disclosure.
Figure 10A:
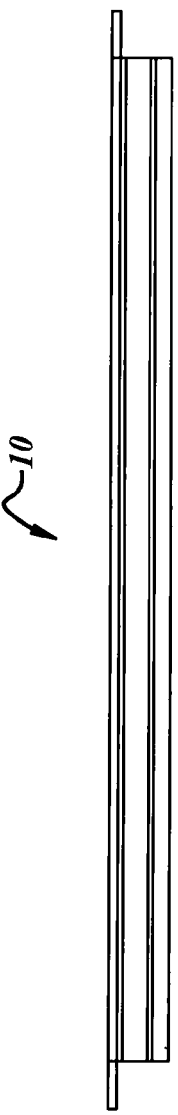
FIG. 10A is a front view of a terminal cover, according to the present disclosure.

Referring now to FIGS. 10A-10B, the cover 10 may be shaped to cover exposed portions of the assembly 8. The cover 10 may extend the length of the interconnect sections 14 and/or the entire assembly 8. The cover 10 may also include connective portions 252 that allow the cover to 10 affix to the assembly 8.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A battery interface assembly for a battery system, comprising:
   a first end section that provides a source voltage from battery modules of the battery system via a conductive bus bar;
   a second end section; and
   X intermediate housing sections that receive and house respective sections of said conductive bus bar and that detachably interconnect with each other and with said first and second end sections so that said first and second end sections and said X intermediate housing sections are contiguously aligned, wherein X is an integer greater than or equal to 1.

2. The battery interface assembly of claim 1 wherein said first and second end sections comprise at least one of a male connector and a female connector and interconnect with said X intermediate housing sections via said one of said male and female connectors.

3. The battery interface assembly of claim 1 wherein said X intermediate housing sections each comprise at least one of a male connector and a female connector and detachably interconnect with each other via said one of said male and female connectors, wherein said male connector is a predetermined size smaller than said female connector such that a gap is formed between interconnected ones of said male and female connectors.

4. The battery interface assembly of claim 1 wherein each of said X intermediate housing sections communicates with a respective one of X battery modules.

5. The battery interface assembly of claim 4 wherein L intermediate housing sections interconnect with said X intermediate housing sections and communicate with L battery modules that differ from said X battery modules, wherein L is an integer greater than or equal to 0.

6. The battery interface assembly of claim 5 wherein said X intermediate housing sections and said L intermediate housing sections communicate with X+L respective sections of said conductive bus bar.

7. The battery interface assembly of claim 1 wherein each of said X intermediate housing sections defines a respective portion of a channel, wherein said channel receives a plurality of leads.

8. The battery interface assembly of claim 7 wherein each of said X intermediate housing sections includes lead guides that retain at least one of said plurality of leads at a predetermined angle.

9. The battery interface assembly of claim 1 wherein each of said X intermediate housing sections comprises a support device for a reference voltage cable, wherein one of said first and second end sections communicates with said reference voltage cable.

10. A battery system, comprising the battery interface assembly of claim 1 and further comprising:
    said conductive bus bar, wherein said bus bar further comprises an end bar that communicates with said sections of said bus bar and that communicates externally from the battery system.

11. The battery system of claim 10 wherein at least one of said sections of said bus bar and said end bar comprises layers of woven wire.

12. A battery system, comprising:
    X interconnecting sections of a battery interface assembly that cover terminals of Y battery modules, wherein adjacent ones of said X interconnecting sections detachably couple together; and
    a bus bar that comprises Z sections that are received in respective ones of said X interconnecting sections and that communicate with said terminals of respective ones of said Y battery modules, wherein said bus bar provides a source voltage from at least one of said Y battery modules, and wherein X, Y and Z are integers greater than 1.

13. The battery system of claim 12 wherein said X interconnecting sections comprise a first end section a second end section and Y intermediate sections positioned between said first and second end sections, wherein said first and second end sections differ from said intermediate sections.

14. The battery system of claim 13 wherein said first and second end sections comprise at least one of a male connector and a female connector and interconnect with said Y intermediate sections via said one of said male and female connectors.

15. The battery system of claim 13 wherein said Y intermediate sections each comprise at least one of a male connector and a female connector and detachably interconnect with each other via said one of said male and female connectors.

16. The battery system of claim 13 wherein L intermediate sections interconnect with said Y intermediate sections and communicate with terminals of L battery modules that differ from said Y battery modules, wherein L is an integer greater than or equal to 0.

17. The battery system of claim 16 wherein said Y intermediate sections and said L intermediate sections communicate with Z+L respective sections of said conductive bus bar.

18. The battery system of claim 12 wherein at least one of said Z sections of said conductive bus bar comprises layers of woven wire.

19. The battery system of claim 12 wherein said bus bar further comprises an end bar that communicates with said Z sections of said conductive bus bar and that communicates externally from the battery system.

20. The battery system of claim 12 wherein each of said X interconnecting sections defines a respective portion of a channel, wherein said channel receives a plurality of leads, and wherein each of said X interconnecting sections includes lead guides that retain at least one of said plurality of leads at a predetermined angle.

21. The battery system of claim 12 wherein a first one of said X interconnecting sections includes a connector that detachably couples together with a second one of said X interconnecting sections, wherein said connector includes a head portion and a neck portion, and wherein said second one of said X interconnecting sections includes a first side that defines an opening that receives said neck portion.

22. The battery system of claim 21 wherein said neck portion includes a predetermined length that is longer than a thickness of said first side.

23. The battery system of claim 21 wherein a cross section of said neck is smaller than an area of said opening such that said connector moveable couples to said first side.

* * * * *

UNITED STATES PATENT AND TRADEMARK OFFICE
CERTIFICATE OF CORRECTION

PATENT NO. : 7,604,507 B1  Page 1 of 1
APPLICATION NO. : 12/188573
DATED : October 20, 2009
INVENTOR(S) : Millon It is certified that error appears in the above-identified patent and that said Letters Patent is hereby corrected as shown below:

Column 2, Line 60, delete "moveable", insert --moveably--.

Column 5, Line 1-2, delete "addition", insert --additional--.

Column 6, Line 25, delete "bars", insert --bar--.

Column 6, Line 63, delete "cover to 10", insert --cover 10 to--.

Column 8, Line 14, Claim 19, after "first end section", insert --,--.

Column 8, Line 63, Claim 23, delete "moveable", insert --moveably--.

Signed and Sealed this

Twelfth Day of January, 2010

David J. Kappos
*Director of the United States Patent and Trademark Office*